United States Patent [19]
Hirose et al.

[11] Patent Number: 5,121,265
[45] Date of Patent: Jun. 9, 1992

[54] MAGNETIC RECORDING AND REPRODUCING APPARATUS

[75] Inventors: Koichi Hirose, Yokohama; Masaharu Aridome, Kamakura; Shigeru Okada; Iwao Aizawa, both of Yokohama, all of Japan

[73] Assignee: Hitachi, Ltd., Tokyo, Japan

[21] Appl. No.: 333,272

[22] Filed: Apr. 5, 1989

[30] Foreign Application Priority Data

Apr. 6, 1988 [JP] Japan .................................. 63-82914

[51] Int. Cl.⁵ .............................................. G11B 15/14
[52] U.S. Cl. ...................................................... 360/64
[58] Field of Search ........................ 360/64, 67, 68, 124

[56] References Cited
U.S. PATENT DOCUMENTS

| | | | |
|---|---|---|---|
| 4,008,493 | 2/1977 | Pizzuro | 360/124 |
| 4,342,059 | 7/1982 | Wray | 360/124 |
| 4,605,974 | 8/1986 | Ochi et al. | 360/64 |
| 4,636,873 | 1/1987 | Eguchi | 360/64 |
| 4,945,439 | 7/1990 | Sato | 360/124 |

Primary Examiner—Vincent P. Canney
Attorney, Agent, or Firm—Antonelli, Terry, Stout & Kraus

[57] ABSTRACT

A magnetic recording and reproducing apparatus including a recording head, reproducing heads and reproducing pre-amplifiers each mounted on a rotating cylinder for allowing recording and reproducing operations at the same time, in which two signal channels are defined by first and second double azimuth heads each made up of two reproducing heads and first and second integrated circuits are arranged on the rotating cylinder in close proximity to the first and second double azimuth heads, respectively. Each of the integrated circuits includes two pre-amplifiers corresponding to two reproducing heads of the first or second double azimuth head and selectively outputs one of two amplified reproduced signals from the above pre-amplifiers which is higher in signal level, and a head discrimination signal is added to the output signal. The input part of each reproducing pre-amplifier is constructed to perform a differential operation, and one of the output signals of the first and second integrated circuits is selectively sent to a fixed side through a single transmission means in accordance with a control signal supplied from the outside. The magnetic recording and reproducing apparatus having the above construction can be made small in jitter and crosstalk, and can reduce the number of elements for transmitting signals between the rotating cylinder and the fixed side.

15 Claims, 7 Drawing Sheets

MAGNETIC RECORDING AND REPRODUCING APPARATUS

BACKGROUND OF THE INVENTION

The present invention relates to a magnetic recording and reproducing apparatus, and more particularly to an electric circuit suitable for use in a magnetic recording and reproducing apparatus which is so constructed as to be able to perform recording and reproducing operations at the same time, and which has a rotating cylinder having a relatively small diameter on which a reproducing pre-amplifier is mounted.

In a magnetic recording/reproducing apparatus using a rotating magnetic head, a rotary transformer is generally used for signal transmission between the rotating head and a signal processing circuit, and one signal transmission channel formed of a rotary transformer is required for one rotating magnetic head. In Japanese patent application publication No. JP-A-63-74101, it is described how magnetic heads and electric parts are arranged on a rotating cylinder to attain dynamic balance. According to the arrangement, however, the number of rotary transformers for forming signal transmission channels increases as the number of magnetic heads is larger. That is, each channel is low in transmission efficiency, and crosstalk between channels increases. Further, it is impossible to form a desired number of channels in a limited space. In order to solve such problems, an apparatus in which amplifiers and a changeover switch are mounted on a rotating cylinder to reduce the number of rotary transformers for forming signal transmission channels is described in a Japanese patent application publication No. JP-A-59-96509.

In a case where circuit parts such as a reproducing pre-amplifier are mounted on a rotating cylinder as mentioned above, it is very important how electric power and a control signal are supplied to the circuit parts on the rotating cylinder, and it is also important to reduce elements for transmitting signals between the rotating cylinder and a fixed part. Further, in a case where recording and reproducing magnetic heads and a reproducing pre-amplifier are mounted on a rotating cylinder having a relatively small diameter such as the rotating cylinder of a home video tape recorder to perform recording and reproducing operations at the same time, however, the most important problem is to reduce jitter and crosstalk. In more detail, in a home video tape recorder which is required to be small in size and weight, the moment of inertia of a rotating cylinder is small. Accordingly, when electric parts such as a reproducing pre-amplifier are mounted on the rotating cylinder, it is very difficult for the rotating cylinder to attain dynamic balance. Thus, the so-called jitter is increased. Further, since the rotating cylinder has a relatively small diameter, a recording head and a reproducing head are arranged in close proximity to each other. Thus, the capacitance between the recording head and the reproducing head is increased, and moreover the capacitance between the wiring pattern for the recording head and the wiring pattern for the reproducing head is increased. Owing to the increase in capacitance between the recording and reproducing heads and the increase in capacitance between the wiring patterns, the crosstalk between a recording signal and a reproduced signal is increased. As a result, a beat or the like is generated. Thus, the picture quality of a reconstructed image is degraded. Further, in an apparatus for performing special reproducing operations such as a search operation and the formation of a still image, a relatively large number of magnetic heads and reproducing pre-amplifiers are mounted on a rotating cylinder. Accordingly, it is very difficult for the rotating cylinder to attain dynamic balance, and moreover elements for transmitting signals between the rotating cylinder and a fixed part are increased.

SUMMARY OF THE INVENTION

An object of the present invention is to provide an electric circuit included in a magnetic recording/reproducing apparatus which has a rotating cylinder on which recording and reproducing heads and a reproducing pre-amplifier are mounted in order for reducing the crosstalk between recording and reproduced signals and for reducing the number of circuit parts for forming transmission channels, and more particularly to provide an electric circuit suitable for use in a magnetic recording/reproducing apparatus capable of performing recording and reproducing operations simultaneously, or a magnetic recording/reproducing apparatus including four reproducing heads which make up two double azimuth heads.

According to one aspect of the present invention, there is provided a magnetic recording and reproducing apparatus in which a plurality of reproducing heads and reproducing pre-amplifiers are mounted on a rotating cylinder together with a recording head so that each of the reproducing pre-amplifiers is arranged in close proximity to a corresponding one of the reproducing heads, the recording head, reproducing heads and reproducing pre-amplifiers are disposed on the rotating cylinder so that the rotating cylinder can keep dynamic balance, and the input part of each reproducing preamplifier is constructed to perform a differential operation.

According to another aspect of the present invention, there is provided an electric circuit in which the outputs of two reproducing heads for forming a double azimuth head are alternately output with the aid of changeover means to form a reproduced signal, and information for discriminating between azimuth angles of gaps of two reproducing heads is mixed with the reproduced signal to be sent to a reproduced-signal processing circuit together with the reproduced signal.

According to the present invention, circuit means such as a reproducing pre-amplifier is arranged in close proximity to a reproducing head, and thus the wiring between the reproducing head and the reproducing pre-amplifier is short. Further, not only the reproducing pre-amplifier but also a recording amplifier is formed so as to perform a differential operation. Thus, even when recording and reproducing heads are spaced apart from each other only a small distance because of the small diameter of a rotating cylinder, the crosstalk between recording and reproducing signals can be reduced. Accordingly, an excellent reproduced image can be obtained simultaneously with a recording operation. Further, in a case where a reproduced signal is output from a rotating cylinder at the same time that a recording signal is input to the rotating cylinder with the aid of rotary transformers, the rotary transformers can be formed so as to use a common magnetic core.

Further, according to the present invention, two adjacent channels for a double azimuth head are alternately selected to form a reproduced signal, and information for discriminating between azimuth angles corresponding to two channels is mixed with the reproduced signal to be sent to a reproduced-signal processing circuit together with the reproduced signal. Thus, the number of elements for transmitting signals between a rotating cylinder and a fixed side such as rotary transformers can be reduced, and moreover a reproduced chrominance signal can be corrected even in a special reproducing operation. That is, a chrominance signal can be always reproduced correctly.

DESCRIPTION OF THE PREFERRED EMBODIMENTS

Figure 1:
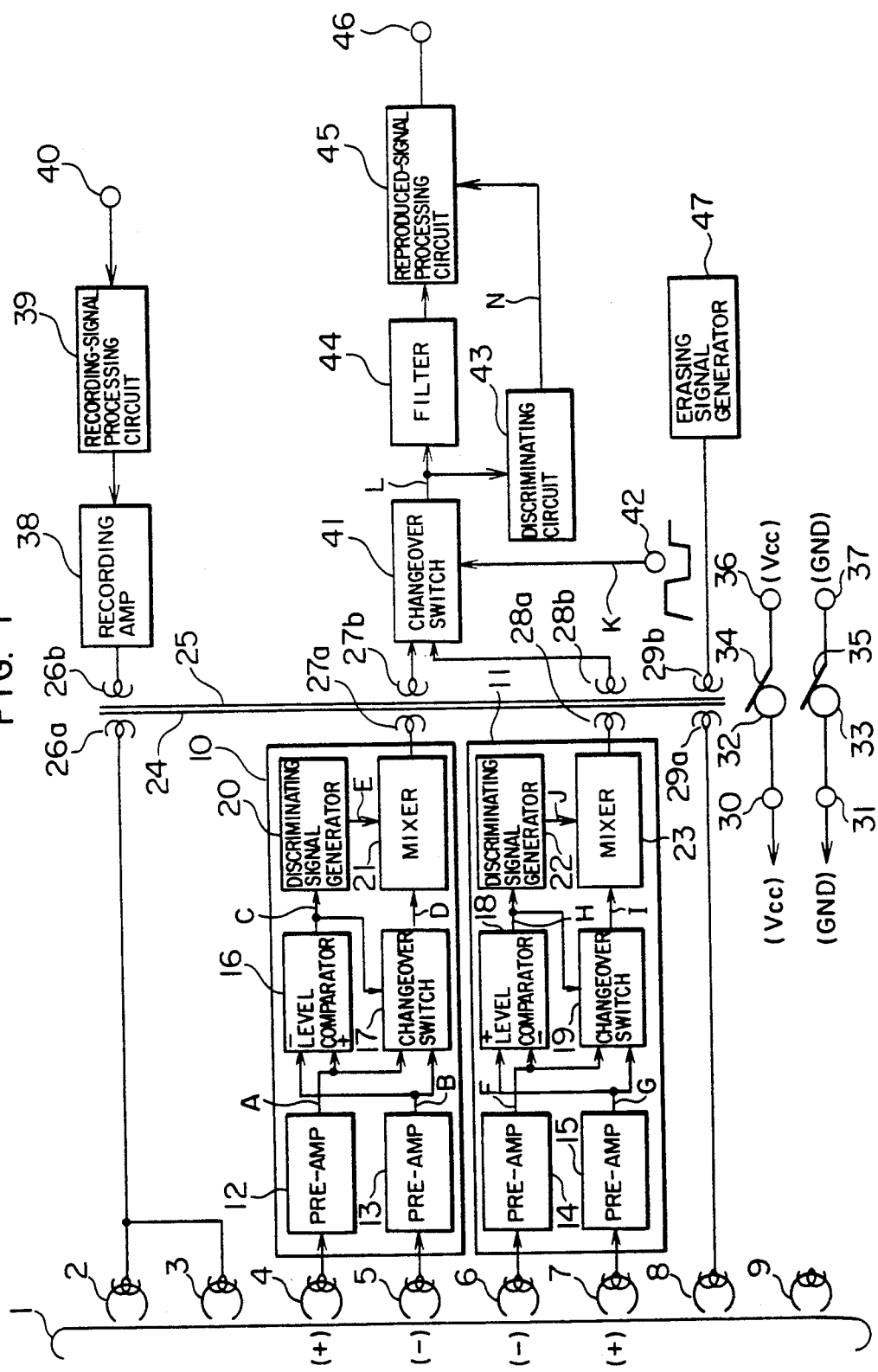
FIG. 1 is a block diagram showing an electric circuit which is included in an embodiment of a magnetic recording/reproducing apparatus according to the present invention.

FIG. 1 is a block diagram showing an electric circuit which is included in an embodiment of a magnetic recording/reproducing apparatus according to the present invention. The electric circuit of FIG. 1 has a function of monitoring a reproduced image at the same time that a video signal is recorded on a magnetic tape, and is suitable for use in a video tape recorder provided with a double azimuth reproducing head. In FIG. 1, reference numeral 1 designates a magnetic tape, 2 and 3 recording magnetic heads, 4 and 5 reproducing magnetic heads making up a first double azimuth head, 6 and 7 reproducing magnetic heads making up a second double azimuth head, 8 a erasing magnetic head, 9 a dummy head, 10 a first circuit block, 11 a second circuit block, 12 to 15 reproducing pre-amplifiers, 16 and 18 level comparators, 17, 19 and 41 changeover switches, 20 and 22 discriminating-signal generating circuits, 21 and 23 adders of mixers, 26a to 29a windings on the rotating side of rotary transformers, 26b to 29b windings on the fixed side of the rotary transformers, 24 a magnetic core on the rotating side of the rotary transformers, 25 a magnetic core on the fixed side of the rotary transformers, 30 and 36 power supply terminals, 31 and 37 ground terminals, 32 and 33 rotary rings, 34 and 35 brushes, 38 a recording amplifier, 39 a recording-signal processing circuit, 40 a recording video signal input terminal, 42 a control signal input terminal, 43 a channel discriminating circuit, 44 a filter, 45 a reproduced-signal processing circuit, 46 a reproduced video signal output terminal, and 47 an erasing signal generator. It is to be noted that the first and second circuit blocks 10 and 11 are mounted on a rotating cylinder.

Figure 2:
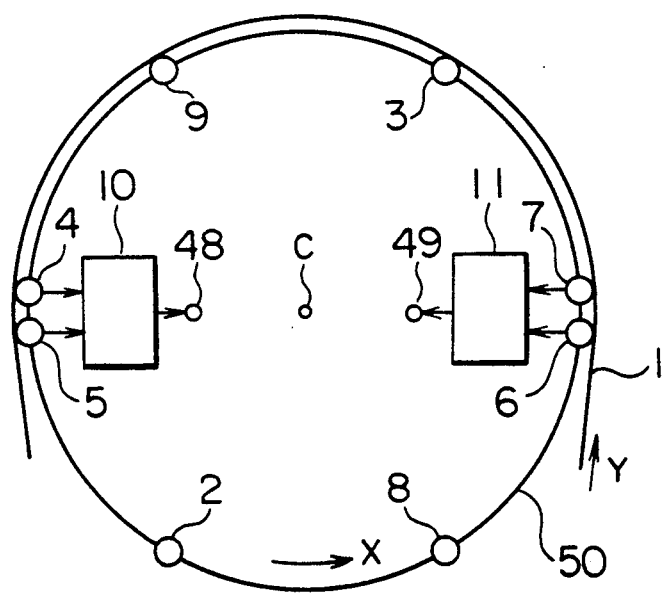
FIG. 2 is a schematic diagram showing the arrangement of members on a rotating cylinder.

Prior to the explanation of the operation of the electric circuit shown in FIG. 1, explanation will be made of how various members are arranged on a rotating cylinder with reference to FIG. 2. In the drawings, like reference numerals designate like parts. Referring to FIG. 2, a rotating cylinder 50 turns on a center axis C in an X-direction, and the magnetic tape 1 is wound around the rotating cylinder 50 through an angle slightly greater than 180°. Further, the magnetic tape 1 is moved in a Y-direction. The recording heads 2 and 3 are used for recording a video signal on the magnetic tape 1. The reproducing heads 4 and 5 are different in azimuth from each other and make up the first double azimuth head. The reproducing heads 6 and 7 are different in azimuth from each other and make up the second double azimuth head. The reproducing heads 4 to 7 are used for reproducing the video signal from the magnetic tape 1. The recording heads 2 and 3 are arranged so as to be symmetrical with respect to the center axis C (that is, the axis of rotation), and the heads 4 to 7 are also arranged so as to be symmetrical with respect to the axis of rotation. Thus, the recording heads 2 and 3 can be alternately used for a recording operation at intervals of one field, and the first and second double azimuth heads can be alternately used for a reproducing operation at intervals of one field. In other words, the first double azimuth head and the second double azimuth head are arranged so as to be symmetrical with respect to the axis of rotation. In more detail, the reproducing head 4 of the first double azimuth head and the reproducing head 6 of the second double azimuth head are made different in azimuth from each other and are arranged so as to be symmetrical with respect to the axis of rotation, and the reproducing head 5 of the first double azimuth head and the reproducing head 7 of the second double azimuth head are made different in azimuth from each other and are arranged so as to be symmetrical with respect to the axis of rotation. Further, the reproducing heads 4 and 5 for making up the first double azimuth head are arranged in close proximity to each other, and the reproducing heads 6 and 7 for making up the second double azimuth head are arranged in close proximity to each other. The first and second circuit blocks 10 and 11 are arranged in close proximity to the first and second double azimuth heads, respectively, and moreover are made symmetrical with respect to the axis of rotation. The reproducing heads 4 and 5 for forming the first double azimuth head are connected to the first circuit block 10, and the reproducing heads 6 and 7 for forming the second double azimuth head are connected to the second circuit block 11. In the first circuit block 10, weak signals obtained by the reproducing heads 4 and 5 are amplified, and then combined with the aid of a changeover switch to form an output signal, which is output at a terminal 48. In the second circuit block 11, weak signals obtained by the reproducing heads 6 and 7 are amplified, and then combined with the aid of a changeover switch to form an output signal, which is output at a terminal 49. Incidentally, the terminals 48 and 49 correspond to the output terminals of the mixers 21 and 23, respectively. As mentioned above, the first and second circuit blocks 10 and 11 are assigned to the first and second double azimuth heads, respectively, and are arranged so as to be symmetrical with respect to the axis of rotation. Accordingly, there is no fear of destroying dynamic balance. That is, various electric parts including a plurality of magnetic heads are mounted on the rotating cylinder so as to be symmetrical with respect to the axis of rotation of the rotating cylinder. Hence, it is easy for the rotating cylinder to keep dynamic balance. Accordingly, the jitter of a reproduced video signal is never increased, though a large number of electric parts are mounted on a rotating cylinder which is small in diameter and moment of inertia.

Further, the first and second circuit blocks 10 and 11 process the output signals of the first and second double azimuth heads, respectively. Accordingly, the circuit blocks 10 and 11 can be arranged in close proximity to the first and second double azimuth heads, respectively, and hence the wiring between a reproducing head and a circuit block 10 or 11 can be made short. Thus, the crosstalk from a recording channel to a reproducing channel can be reduced, and an excellent reproduced image can be obtained at the same time that a video signal is recorded on the magnetic tape 1.

Next, explanation will be made of the operation of the electric circuit of FIG. 1. Referring to FIG. 1, a recording signal applied to the terminal 40 is converted by the recording-signal processing circuit 39 into a signal suited for magnetic recording. The signal thus obtained is amplified by the recording amplifier 38, and then sent to the rotating recording heads 2 and 3 through a rotary transformer 26 (26a and 26b). Thus, a video signal is recorded on the magnetic tape 1 in such a manner that the recording heads 2 and 3 different in azimuth are alternately used at intervals of one field (that is, one track) to record the video signal. In the recording-signal processing circuit 39 of a home video tape recorder, the luminance signal of the video signal is subjected to frequency modulation, the frequency of the chrominance sub-carrier is changed to a frequency which lies in a low-frequency range of the frequency-modulated luminance signal, and then the frequency-changed chrominance signal is mixed with the frequency-modulated luminance signal. In the home video tape recorder, however, no guard band is formed between adjacent recording tracks. Accordingly, in the processing circuit 39, phase shift processing is carried out for the carrier chrominance signal. In the VHS method, the carrier of the chrominance signal which is recorded by a recording head having a positive azimuth angle is advanced by a phase angle of 90° at intervals of one horizontal scanning period. Also, the carrier of the chrominance signal which is recorded by a recording head having a negative azimuth angle is delayed by a phase angle of 90° at intervals of one horizontal scanning period. In a reproducing operation, the phase of the carrier of the chrominance signal is returned to an original state by correction processing.

An erasing operation is performed in the following manner. A high-frequency signal is generated by the erasing-signal generator 47 to be input to the erasing head 8 through the rotary transformer 29 (29a, 29b). Thus, in a case where overlap recording is carried out, the erasing head 8 can perform an erasing operation for that area of the magnetic tape where a video signal has been recorded before the recording head 2 or 3 performs a recording operation for the above area.

Next, explanation will be made of the reproducing operation of the electric circuit of FIG. 1. The reproducing heads 4 and 5 making up the first double azimuth head are connected to the pre-amplifiers 12 and 13 of the first circuit block 10, respectively. Thus, reproduced signals from the reproducing heads 4 and 5 are amplified by the pre-amplifiers 12 and 13, respectively, and then applied to the level comparator 16 and the changeover switch 17. The amplitudes of the reproduced signals of the two channels are compared with each other by the level comparator 16, and the comparator 16 sends a signal indicating in which of two channels the amplitude of the reproduced signal is larger to the discriminating-signal generator 20 and the changeover switch 17. The changeover switch 17 selects the channel in which the amplitude of the reproduced signal is larger, and outputs the reproduced signal of the selected channel to the mixer 21. In the mixer 21, a signal from the discriminating-signal generator 20 is mixed with the reproduced signal from the changeover switch 17. The resultant signal thus obtained is sent to the fixed side through the rotary transformer 27 (27a, 27b). The discriminating-signal generator 20 generates a discriminating signal indicating which of the two channels has produced the reproduced signal from the changeover switch 17. Accordingly, the discriminating signal varies with the output signal of the level comparator 16. In more detail, a high-frequency carrier is amplitude-, phase-, or frequency-modulated with a low-frequency binary signal for indicating which of the two channels has produced the reproduced signal from the switch 17 to obtain the discriminating signal. The carrier frequency of the discriminating signal is made far higher than the frequency range of the reproduced signal so that the reproduced signal is not adversely affected by the discriminating signal.

The reproducing heads 6 and 7 for making up the second double azimuth head are connected to the pre-amplifiers 14 and 15 of the second circuit block 11, respectively. The second circuit block 11 has the same function as that of the first circuit block 10, and performs the same operation as in the first circuit block 10. In the mixer 23, the reproduced signal selected by the changeover switch 19 is mixed with a discriminating signal for indicating which of the two channels has produced the selected reproduced signal. The resultant signal thus obtained is sent to the fixed side through the rotary transformer 28 (28a, 28b). The first and second circuit blocks 10 and 11 are mounted on an end face of the rotating cylinder having a small diameter. Accordingly, it is required to make the first and second circuit blocks 10 and 11 small in size. However, each of the first and second circuit blocks 10 and 11 is relatively large in the scale of circuit construction. Hence, it is preferable to form each circuit block of an integrated circuit. Electric power is supplied from the fixed side to various circuit parts mounted on the rotating cylinder through the rotary rings 32 and 33 and the brushes 34 and 35.

The reproduced signals which are sent to the fixed side through the rotary transformers 27 and 28 are alternately output by the changeover switch 41 at intervals of one field in accordance with a control signal applied to the terminal 42. The taken-out signal is applied to the filter 44 and the discriminating circuit 43. In the discriminating circuit 43, the discriminating signal is separated from the reproduced signal, and is then demodulated to judge which of the two channels has produced the reproduced signal. Further, a signal indicating which of the two channels has produced the reproduced signal is sent from the discriminating circuit 43 to the reproduced-signal processing circuit 45. Only the reproduced signal is extracted from the output signal of the changeover switch 41 by the filter 44 which is provided between the switch 41 and the reproduced-signal processing circuit 45. In the processing circuit 45, the reproduced signal from the filter 44 is subjected to processing opposite to the processing in the recording-signal processing circuit 39. Thus, a reproduced video signal is delivered to the terminal 46. In the processing circuit 45, the reproduced chrominance signal is also corrected on the basis of the signal from the discriminating circuit 43.

The reproducing heads 4 and 7 are equal in azimuth to each other, and the reproducing heads 5 and 6 are equal in azimuth to each other. However, the reproducing heads 4 and 7 are different in azimuth from the reproducing heads 5 and 6. In a conventional reproducing system using two double azimuth heads, the reproduced signals from four reproducing heads are first amplified. One of two amplified reproduced signals from reproducing heads which are different in azimuth from each other and are arranged so as to be symmetrical with respect to the axis of rotation of the rotating cylinder is changed over to the other amplified reproduced signal, and then one of two amplified reproduced signals from the remaining reproducing heads which are different in azimuth from each other and are arranged so as to be symmetrical with respect to the above axis of rotation is changed over to the other amplified reproduced signal. When one circuit block having such a changeover function is mounted on the rotating cylinder, it will be difficult for the rotating cylinder to attain dynamic balance. When two circuit blocks each including two pre-amplifiers are used in the conventional reproducing system to solve the above problem, two reproduced signals from reproducing heads 4 and 6 (or 5 and 7) which are different in azimuth from each other and are arranged so as to be symmetrical with respect to the axis of rotation are supplied to one circuit block. Hence, the wiring conductors for connecting the reproducing heads to the circuit block is long. Thus, the crosstalk between a recording channel and the reproducing channel is increased. According to one aspect of the present invention, reproduced signals from reproducing heads which are arranged so as to be symmetrical with respect to the axis of rotation are not supplied to one circuit block, but reproduced signals from adjacent reproducing heads are supplied to a circuit block which is arranged in close proximity to the adjacent reproducing heads. Accordingly, the wiring conductors for connecting the reproducing heads to the circuit block can be made short. Hence, the crosstalk between the recording channel and the reproducing channel can be reduced. Further, according to another aspect of the present invention, the amplitudes of reproduced signals from adjacent reproducing heads are compared with each other, and one of the reproduced signals which is larger in amplitude than the other is selected. Further, a signal for indicating a selected channel (that is, selected reproducing head) is mixed with the selected reproduced signal, and the resultant signal thus obtained is sent to the fixed side. Thus, elements for the signal transmission between the rotating cylinder and the fixed side (that is, rotary transformers) can be reduced, and a chrominance signal can be correctly reproduced. In the present embodiment, various circuits mounted on the rotating cylinder make up two circuit blocks 10 and 11. In a case where many circuits on the rotating cylinder are formed of a monolithic or hybrid integrated circuit, it is preferable to arrange two integrated circuits corresponding to the circuit blocks 10 and 11 on the rotating cylinder so that the rotating cylinder can attain dynamic balance. However, in order to attain dynamic balance, it is not always required to arrange two circuit blocks or integrated circuits on the rotating cylinder, but a large number of circuit parts may be arranged on the rotating cylinder so as to be symmetrical with respect to the axis of rotation of the rotating cylinder.

Figure 3:
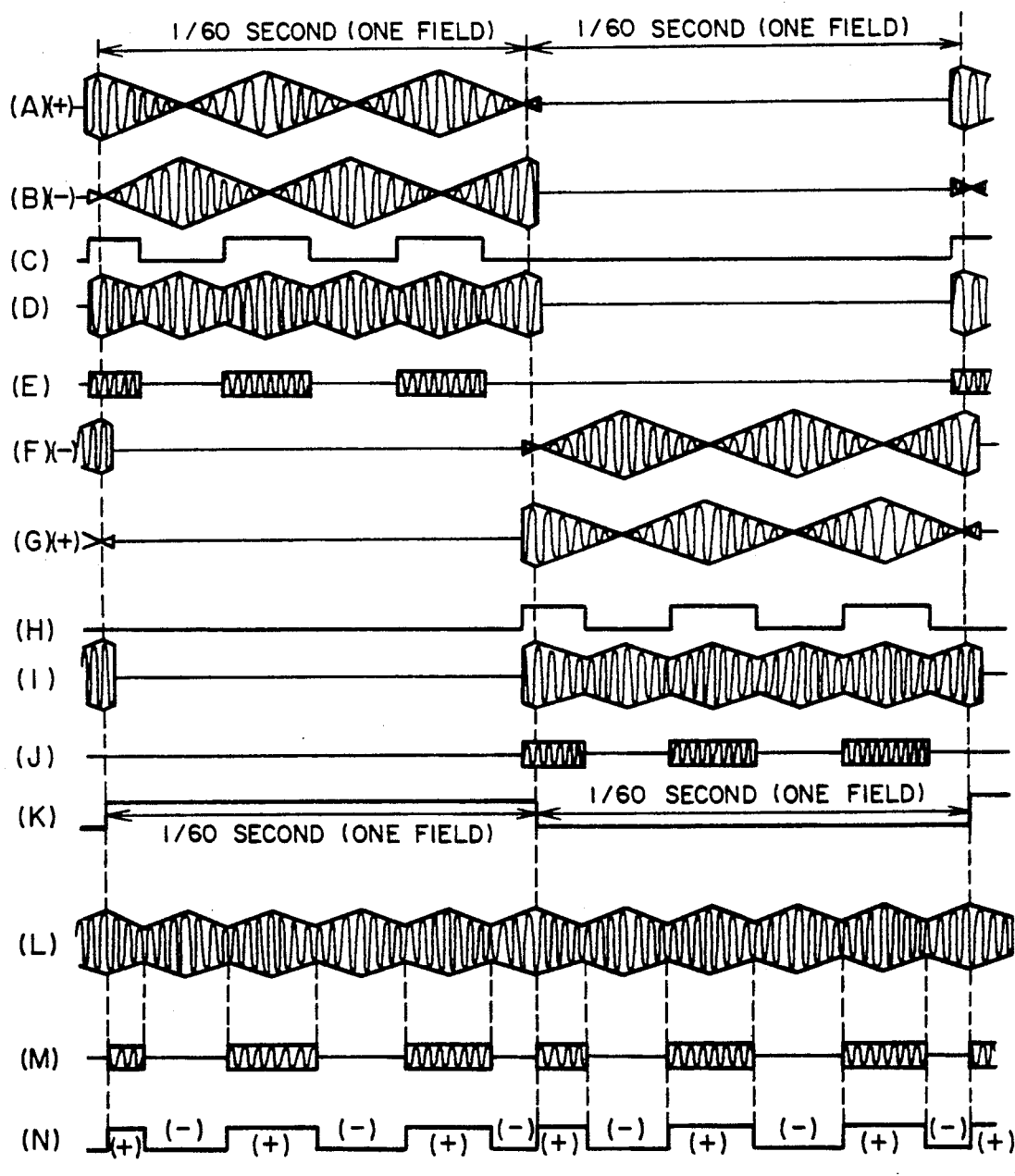
FIG. 3 consisting of A through N is a waveform chart showing signal waveforms at various parts of the electric circuit of FIG. 1.

Next, explanation will be made of the search operation included in special reproducing operations. FIG. 3 is a waveform chart which shows signal waveforms at various circuit parts in the search operation. In FIG. 3, reference characters (A) and (B) indicate the waveforms of reproduced signals from adjacent reproducing heads 4 and 5 which are opposite in azimuth to each other, (C) the output waveform of the level comparator 16, (D) the output waveform delivered from the changeover switch 17 in response to the output of the level comparator 16, and (E) the output waveform delivered from the discriminating-signal generator 20 in response to the output of the level comparator. In the search operation, recording patterns different in azimuth are alternately traced in an oblique direction at intervals of one track. Accordingly, the amplitudes of reproduced signals from adjacent reproducing heads are alternately increased and decreased as shown in the waveforms (A) and (B). One of the reproduced signals which is larger in amplitude is selected by the changeover switch 17 in response to the output waveform (C) of the level comparator 16. Thus, the changeover switch 17 delivers the waveform (D), in which a small-amplitude portion of one reproduced signal is replaced by a large-amplitude portion of the other reproduced signal. Thus, a noiseless reconstructed image can be obtained. When only the output waveform (D) of the changeover switch 17 is sent to a demodulating circuit, it is impossible to know which of two reproducing heads is indicated by a portion of the waveform (D), and thus the phase correction for chrominance signal may be erroneously carried out in the reproduced-signal processing circuit. That is, it is impossible to reproduce a chrominance signal correctly. As can be seen from the above, it is necessary to send a discriminating signal for indicating which of two channels is indicated by each portion of the output waveform (D) from the rotating cylinder to the fixed side. Reference character (E) in FIG. 3 indicates the waveform of the discriminating signal. The waveform (E) is obtained by performing an ON-OFF operation for a carrier which has a frequency higher than the frequency range of the reproduced signals. The discriminating signal (E) is mixed with the output signal (D) of the changeover switch 17, and the resultant signal thus obtained is sent to the fixed side.

Reference characters (F) to (J) in FIG. 3 indicate signal waveforms at circuit parts corresponding to the reproducing heads 6 and 7 which are arranged on the rotating cylinder so that the first double azimuth head made up of the reproducing heads 4 and 5 and the second double azimuth head made up of the reproducing heads 6 and 7 are symmetrical with respect to the axis of rotation of the rotating cylinder. In more detail, reference characters (F) and (G) indicate the waveforms of reproduced signals from adjacent reproducing heads 6 and 7 which are opposite in azimuth to each other, (H) the output waveform of the level comparator 18, (I) the output waveform delivered from the changeover switch 19 in response to the output of the level comparator 18, and (J) the output waveform delivered from the discriminating-signal generator 22 in response to the output of the level comparator 18. The reproducing heads 6 and 7 are arranged on the rotating cylinder so that the first double azimuth head made up of the reproducing heads 4 and 5 and the second double azimuth head made up of the reproducing heads 6 and 7 are symmetrical with respect to the axis of rotation of the rotating cylinder. Accordingly, the reproduced signals (F) and (G) are obtained for a period when the reproducing heads 4 and 5 do not perform a reproducing operation. However, since the magnetic tape 1 is wound around the rotating cylinder through an angle slightly larger than 180°, the reproducing period due to the first double azimuth head and the reproducing period due to the second double azimuth head overlap each other. Accordingly, each of the first and second double azimuth heads performs a reproducing operation for a period slightly longer than the period corresponding to one field.

The signal waveforms (F) to (J) are similar to the signal waveforms (A) to (E) for the first double azimuth head. In more detail, the waveform (I) is obtained by selecting that one of the reproduced signals (F) and (G) which is higher in level in response to the output waveform (H) of the level comparator 18 for comparing the reproduced signals (F) and (G). Further, like the discriminating signal (E) for the first double azimuth head, the discriminating signal (J) has a large amplitude for the reproduced signal from the reproducing head having a positive azimuth angle. The discriminating signal (J) is mixed with the selected reproduced signal (I) by the mixer 23, and the resultant signal thus obtained is sent to the fixed side.

The resultant signal due to the first double azimuth head and the resultant signal due to the second double azimuth head are alternately selected by the changeover switch 41 at intervals of one field in accordance with the control signal (K) applied to the terminal 42 to form a continuous signal (L). The continuous signal (L) includes a discriminating signal (M). The discriminating signal (M) is extracted by the discriminating circuit 43, which produces an output signal (N) for discriminating between that portion of the continuous signal (L) which results from a reproducing head having a positive gap azimuth, and that portion resulting from a reproducing head having a negative gap azimuth. The output signal (N) is applied to the reproduced-signal processing circuit 45 to be used for the correct reproducing of a chrominance signal.

In the present embodiment, the discriminating signal is mixed with the reproduced signal. However, the discriminating signal may be transmitted independently of the reproduced signal, or the discriminating signal may be mixed with signals other than the reproduced signal. Further, in a case where a reproduced image is monitored at the same time that a video signal is recorded on the magnetic tape, the relation between the gap azimuth in the recording operation and the gap azimuth in the reproducing operation is unequivocally determined, and hence it is not required to transmit the discriminating signal. When the changeover switch 41 is mounted on the rotating cylinder and the control signal (K) is sent from the fixed side to the rotating cylinder, the continuous signal (L) and the discriminating signal (M) are sent to the fixed side by a single rotary transformer. The control signal (K) can be mixed with a different signal, and the resultant signal thus obtained can be sent from the fixed side to the rotating cylinder. In the above case, the number of rotary transformers can be reduced.

Figure 4:
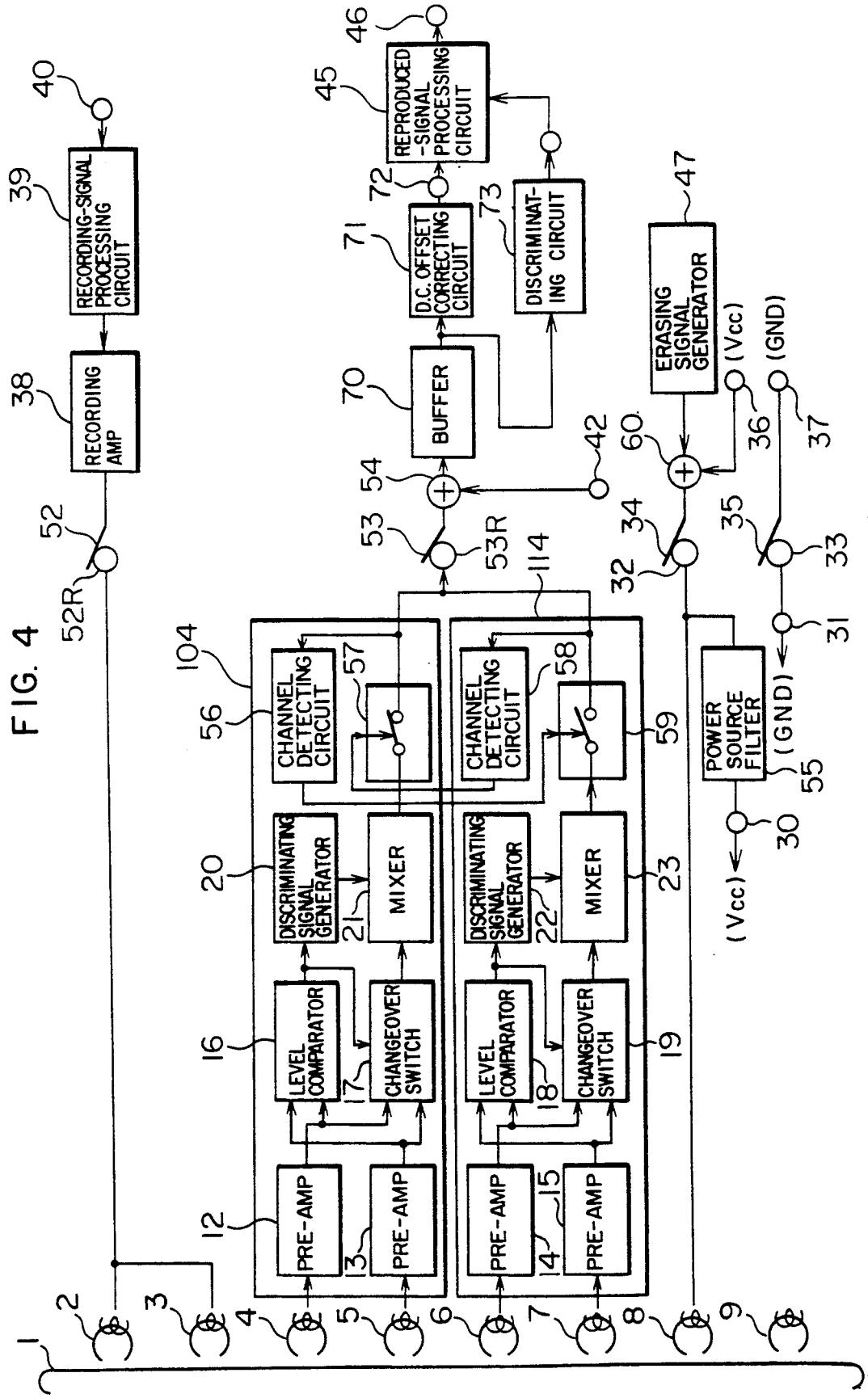
FIG. 4 is a block diagram showing an electric circuit which is included in another embodiment of a magnetic recording/reproducing apparatus according to the present invention.

FIG. 4 is a block diagram showing an electric circuit which is included in another embodiment of a magnetic recording/reproducing apparatus according to the present invention. The electric circuit of FIG. 4 is different from the electric circuit of FIG. 1 in that each of elements for signal transmission between the rotating cylinder and the fixed side is the combination of a rotary ring and a brush, and no rotary transformer is used. Further, the electric circuit of FIG. 4 has a smaller number of elements for signal transmission between the rotating cylinder and the fixed side than the electric circuit of FIG. 1. The combination of a rotary ring and a brush can transmit a D.C. signal. Accordingly, the transmission circuit of a control signal can be simplified by using a rotary ring and a brush.

The operation of the electric circuit of FIG. 4 will be explained. It is to be noted that, since the same circuits and elements in FIGS. 1 and 4 are designated by the same reference numerals, only an operation different from the operation of the electric circuit of FIG. 1 is explained. Referring to FIG. 4, a recording signal is supplied to the recording heads 2 and 3 through a brush 52 and a rotary ring 52R. By means of adder 60, a source voltage $V_{CC}$ supplied to the terminal 36 is mixed with the erasing signal from the erasing-signal generator 47, and the resultant signal thus obtained is sent to the rotating cylinder through the brush 34 and the rotary ring 32. The erasing signal which is sent to the rotating cylinder together with the source voltage, is applied to the erasing head 8 through a D.C. voltage blocking capacitor (not shown). Also, the source voltage is separated from the erasing signal by a power source filter 55 to be applied to various parts through the terminal 30. Two reproduced signals applied to channel switches 57 and 59 are alternately selected to form a single reproduced signal which is sent to the fixed side through a brush 53 and a rotary ring 53R. A control signal for controlling the above selecting operation is applied to the switches 57 and 59 in the following manner. The control signal applied to the terminal 42 is supplied to a mixer or adder 54 which is connected to the brush 53, and mixed with the signal from the brush 53. Thus, the control signal can be sent to the rotating cylinder through the brush 53 and the rotary ring 53R. The control signal sent to the rotating cylinder is extracted by channel detecting circuits 56 and 58 which are included in first and second circuit blocks 104 and 114, respectively, to control the channel switches 57 and 59.

The combination of a rotary ring and a brush makes it possible to transmit a D.C. signal between the rotating cylinder and the fixed side. Thus, by using the combination of a rotary ring and a brush, the number of elements for transmitting signals between the rotating cylinder and the fixed side can be diminished without greatly increasing the number circuit elements, provided that a mixer for mixing a D.C. signal with an A.C. signal and a separating circuit for separating the D.C. signal from the A.C. signal are appropriately selected. That is, when no rotary transformer is used as shown in FIG. 4, the electric circuit of a magnetic recording/reproducing apparatus can be made small in size and low in manufacturing cost.

Figure 5:
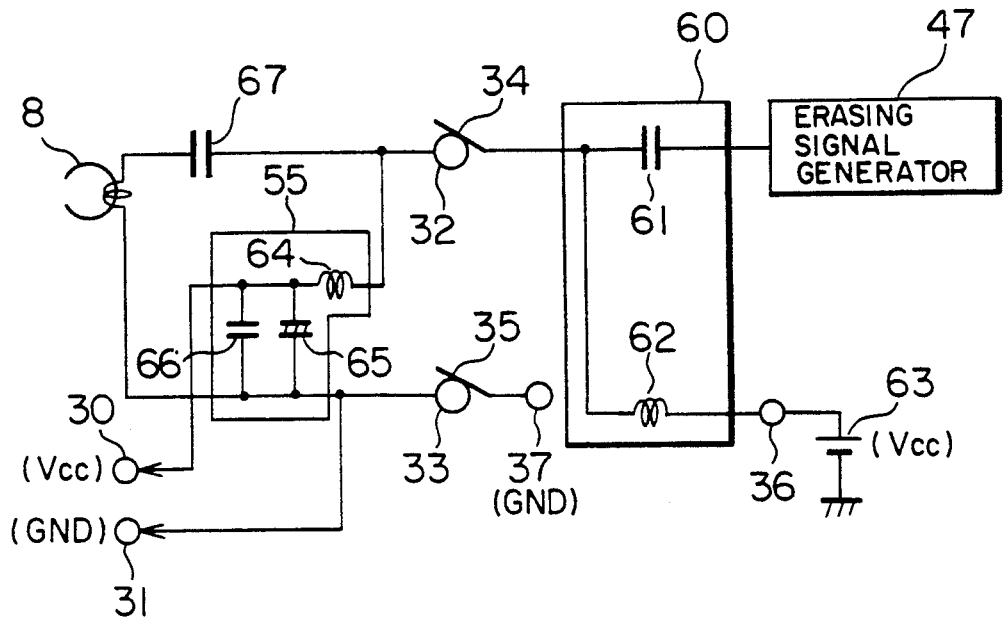
FIG. 5 is a circuit diagram showing the erasing-signal transmission circuit of FIG. 4 in detail.
Figure 6:
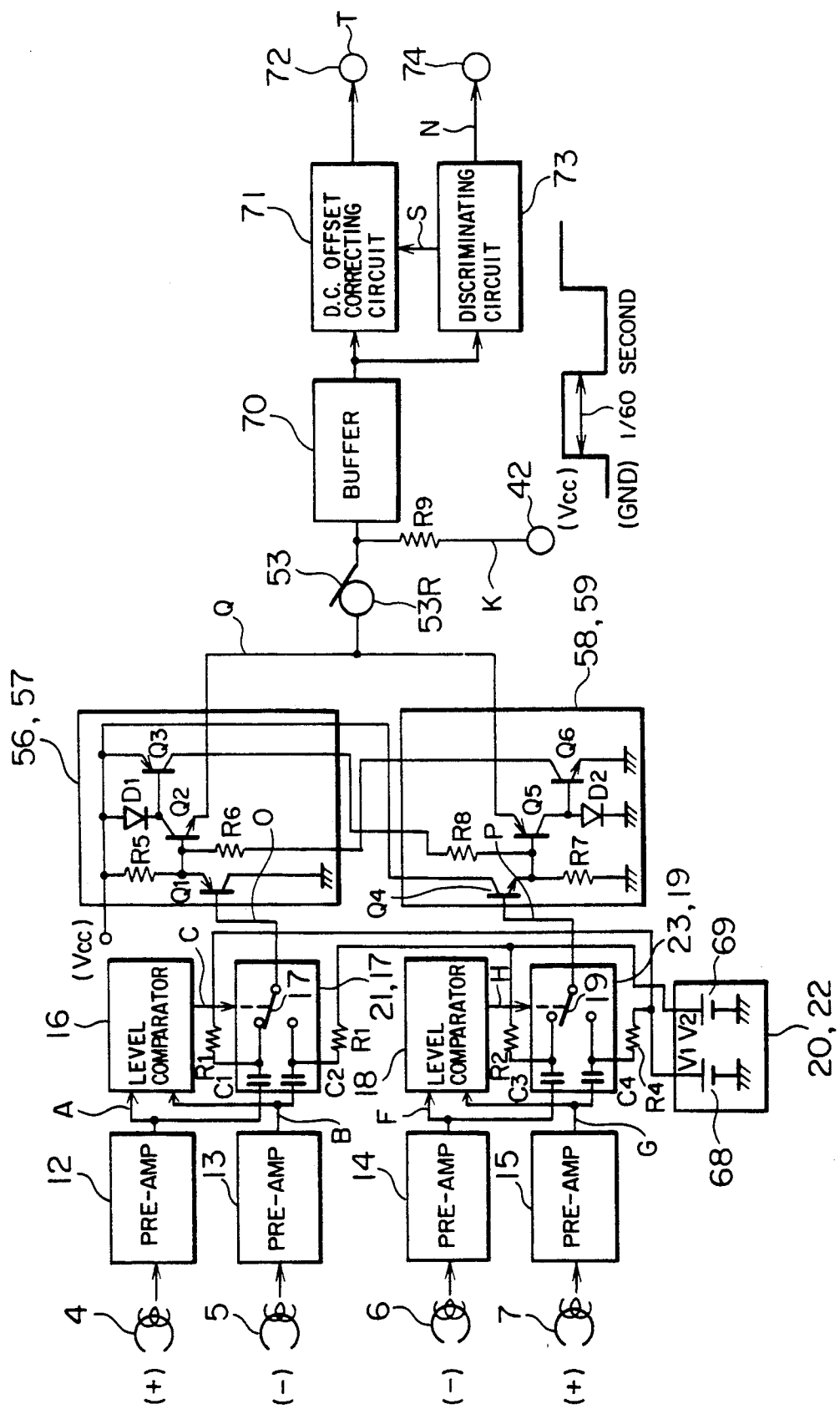
FIG. 6 is a circuit diagram showing that part of the electric circuit of FIG. 4 which is used for the multiplex transmission of a reproduced video signal and a channel discriminating signal in detail.

FIGS. 5 and 6 show actual circuit configurations for multiplex transmission carried out in the electric circuit of FIG. 4. In more detail, FIG. 5 shows a circuit for transmitting the resultant signal of a source voltage and an erasing signal, and FIG. 6 is a circuit for transmitting the resultant signal of a reproduced signal and a channel discriminating signal. Referring to FIG. 5, the erasing signal from the erasing-signal generator 47 passes through the D.C. voltage blocking capacitor 61 of a mixer 60, and the source voltage $V_{cc}$ from a D.C. source 63 passes through the A.C. voltage blocking coil 62 of the mixer 60 to be mixed with the erasing signal. The resultant signal thus obtained is sent to the rotating cylinder through the brush 34 and the rotary ring 32. Then, only the erasing signal passes through a capacitor 67 to be applied to the erasing head 8. Also, the D.C. voltage is sent to the terminal 30 through the power source filter 55 which is made up of a coil 64 and by-pass capacitors 65 and 66. As mentioned above, by using a mixer and a separating circuit which are relatively simple in circuit construction, the resultant signal of D.C. and A.C. signals can be readily transmitted from the fixed side to the rotating cylinder. Further, the D.C. signal may be mixed with an A.C. signal other than the erasing signal, for example, a recording signal.

Figure 8:
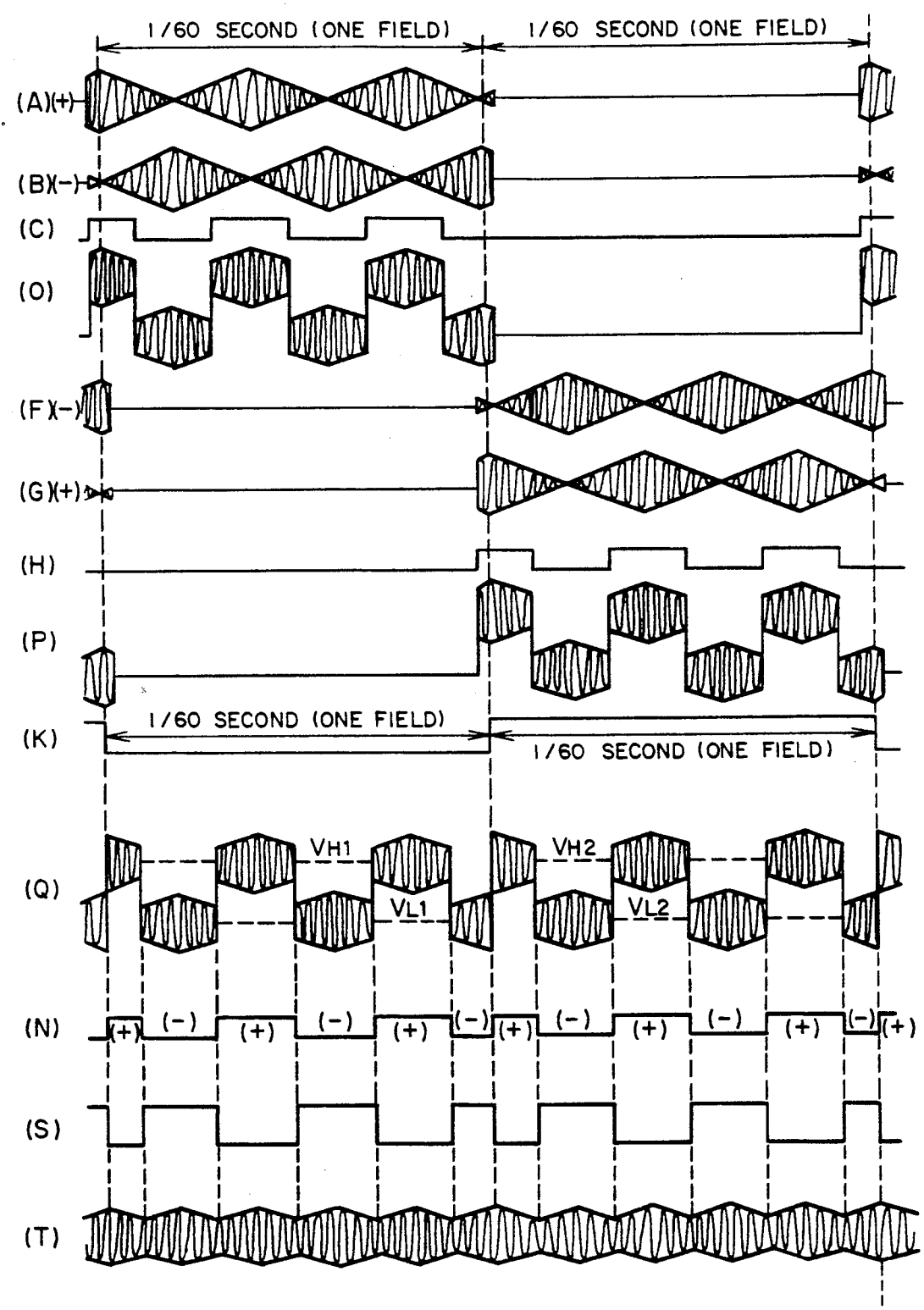
FIG. 8 consisting of A-B, F'4 H, P, K, Q, N, S and T waveforms at various parts of the transmission circuit of FIG. 6.

FIG. 6 shows the circuit construction for multiplex transmission of the reproduced signal and the channel discriminating signal. In the circuit construction of FIG. 6, the channel discriminating signal is transmitted in such a manner that the two channels are made different in D.C. level from each other. FIG. 8 is a waveform chart showing signal waveforms at various parts of the transmission circuit of FIG. 6. Now, the operation of this transmission circuit will be explained, with reference to FIGS. 6 and 8. Output signals (A) and (B) from the pre-amplifiers 12 and 13 are supplied to the changeover switch 17 through capacitors $C_1$ and $C_2$. The connection points of the switch 17 and the capacitors $C_1$ and $C_2$ are connected to power sources 68 and 69 through resistors $R_1$ and $R_2$ to generate a difference in D.C. level between the two channels. Further, a similar difference in D.C. level is generated between output signals (F) and (G) from the pre-amplifiers 14 and 15. The difference in D.C. level (that is, an offset voltage) is generated to discriminate between gap azimuth angles of two reproducing heads for forming a double azimuth head. For example, the reproduced signal from the reproducing head having a positive azimuth angle is made higher in D.C. level than the reproduced signal from the reproducing head having a negative azimuth angle.

The offset voltage (namely, a D.C. offset) serves as the discriminating signal. Reproduced signals (0) and (P) each including the D.C. offset are output from the changeover switches 17 and 19 to two channel change-over circuits (56, 57) and (58, 59) to be alternately selected at intervals of one field by the control signal (K) which is sent from the fixed side to the rotating cylinder through the brush 53 and the rotary ring 53R. The selected reproduced signal (Q) is sent to the fixed side through the rotary ring 53R and the brush 53. The control signal (K) supplied from the terminal 42 is applied to transistors $Q_2$ and $Q_5$ through a resistor $R_9$, the brush 53 and the rotary ring 53R. Each of the transistors $Q_2$ and $Q_5$ is not only used as a buffer for an output signal, but is also used for detecting a channel. When the control signal is at a high level (namely, $V_{cc}$), the transistor $Q_2$ is turned off and the transistor $Q_5$ is turned on. In more detail, when the control signal is brought to a high signal level, the transistor $Q_5$ becomes conductive, and a current flowing through the transistor $Q_5$ turns on a transistor $Q_6$ with the aid of a diode $D_2$. Thus, the collector current of the transistor $Q_6$ reduces the base voltage of the transistor $Q_2$. That is, the transistor $Q_2$ is turned off. When the control signal is brought to a low level (that is, ground potential), the transistor $Q_2$ is turned on. Accordingly, the base voltage of the transistor $Q_5$ is increased, and the transistor $Q_5$ is turned off. That is, the reproduced signal on the $Q_2$ side is delivered. As can be seen from FIG. 6, two emitter-follower circuits which include PNP transistors $Q_1$ and $Q_5$ and NPN transistors $Q_2$ and $Q_4$, are coupled with each other and each of the emitter-follower circuits is formed of a complementary circuit (PNP-NPN or NPN-PNP). This circuit construction is used to hold the D.C. offset between the two selected reproduced signals (namely, the difference between levels $V_{H1}$ and $V_{L1}$ or the difference between levels $V_{H2}$ and $V_{L2}$ in the waveform (Q) of FIG. 8), thereby transmitting the discriminating signal accurately, and to make simple the construction of each of the channel detecting circuits 56 and 58.

As mentioned above, two reproduced signals each including the discriminating signal (namely, the D.C. offset) are alternately selected at intervals of one field to form the continuous reproduced signal (Q), which is supplied to a D.C. offset correcting circuit 71 and a channel discriminating circuit 73 through a buffer 70. In the discriminating circuit 73, the D.C. offset formed between the reproduced signals is detected to discriminate between the reproduced signals. Output signals (S) and (N) from the discriminating circuit 73 are supplied to the D.C. offset correcting circuit 71 and a terminal 74, respectively. In the D.C. offset correcting circuit 71, the D.C. offset formed between the reproduced signals is cancelled by using the output signal (S) of the discriminating circuit 73. For example, the output signal (S) opposite in polarity to the D.C. offset is applied to the continuous reproduced signal (Q). Thus, a normal reproduced signal (T) free from the D.C. offset is sent to a terminal 72 to be supplied to the reproduced-signal processing circuit 45. Further, the output signal (N) of discriminating circuit 73 is sent from the terminal 74 to the reproduced-signal processing circuit 45 to be used for correcting a chrominance signal.

As has been explained in the above, according to the present embodiment, a signal is transferred between the rotating cylinder and the fixed side by the combination of a brush and a rotary ring, and moreover a plurality of kinds of signals can be transferred by multiplex transmission with the aid of a simple circuit configuration. Hence, the number of elements for transmitting signals between the rotating cylinder and the fixed side can be diminished, and a rotary transformers which have hitherto been used as the above transmission elements, can be eliminated. Thus, a magnetic recording/reproducing apparatus can be obtained which is small in crosstalk and simple in circuit construction.

Figure 7:
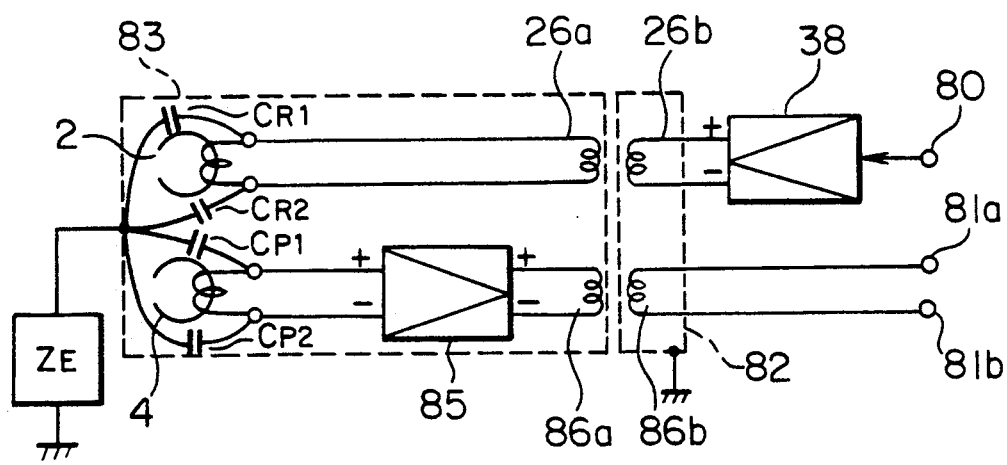
FIG. 7 is a circuit diagram showing the input/output structure of each of a recording amplifier and a reproducing amplifier, and showing the capacitance and impedance which involved in the crosstalk between a recording signal and a reproduced signal.

FIG. 7 shows the structure of the input and output parts of recording and reproducing amplifiers. In the above-mentioned embodiments, the structure of the input and output parts of an amplifier has not been explained. When all of the amplifiers used in FIG. 1 have the input/output structure shown in FIG. 7, the crosstalk between a recording signal and a reproduced signal can be greatly reduced.

It is to be noted that FIG. 7 shows only a part of the electric circuit of FIG. 1, that is, FIG. 7 includes only one recording head and one reproducing head. Further, when an input/output structure similar to that shown in FIG. 7 is used in the electric circuit of FIG. 4, the same effect as in the circuit of FIG. 1 can be obtained. Referring to FIG. 7, the output part of the recording amplifier 38 is constructed to perform a differential operation, and supplies a current to the recording head 2 through the rotary transformer 26 (that is, 26a and 26b). The reproducing head 4 is connected to a reproducing amplifier 85 which includes a pre-amplifier, and the output of the reproducing amplifier 85 is sent to terminals 81a and 81b through a rotary transformer 86 (that is, 86a and 86b). The input part of the pre-amplifier included in the reproducing amplifier 85 is constructed to perform a differential operation. Incidentally, reference numerals 82 and 83 in FIG. 7 designate a fixed cylinder and a rotating cylinder, respectively. Since a recording current is supplied to the recording head 2, a magnetic flux is generated by the recording head. The magnetic flux enters into the reproducing head 4 which is arranged in the vicinity of the recording head 2. Thus, magnetically coupled crosstalk is generated. However, for a high-frequency signal such as a luminance signal, the crosstalk due to capacitive coupling is more serious than the magnetically coupled crosstalk. The magnetic heads 2 and 4 are attached to a metal base, which is fixed to the rotating cylinder 83. Hence, capacitance $C_R$ is defined between the recording head 2 and the cylinder, and capacitance $C_P$ is defined between the reproducing head 4 and the cylinder. The rotating cylinder 83 is connected to the grounded fixed cylinder 82 through, for example, a brush, but an earth impedance $Z_E$ is defined between the rotating cylinder 83 and the ground. That is, the recording head 2 is coupled with the reproducing head 4 by the capacitance $C_R$ and $C_P$ and the earth impedance $Z_E$. Thus, the recording signal leaks out to the reproducing head 4. Since it is impossible to reduce the earth impedance $Z_E$ to zero, the above-mentioned leakage of the recording signal is unavoidable. The amplifier structure according to the present invention can reduce the crosstalk between the recording and reproducing heads in a great degree. Owing to the capacitances $C_{R1}$, $C_{R2}$ between the rotating cylinder 83 and both terminals of the recording head 2, a current flows through the earth impedance $Z_E$ from the rotating cylinder 83 to the fixed cylinder 82. However, the signals at the terminals of the recording head 2 are equal in amplitude and opposite in polarity to each other, and moreover the capacitance $C_{R1}$ between one of the terminals and the cylinder is substantially equal to the capacitance $C_{R2}$ between the other terminal and the cylinder. Accordingly, the crosstalk generated on the rotating cylinder 83 can be made negligible, although the earth impedance $Z_E$ is present. Similarly, the capacitance $C_{P1}$ between one of two terminals of the reproducing head 4 and the cylinder is substantially equal to the capacitance $C_{P2}$ between the other terminal and the cylinder. Hence, even when the crosstalk is generated on the rotating cylinder, signals having the same phase are applied to the positive and negative input terminals of the reproducing amplifier 85. Since the input part of the amplifier 85 performs a differential operation, the crosstalk component is not contained in the output of the amplifier 85. Similarly, the crosstalk due to the wiring between the winding 26a of the rotary transformer 26 and the recording head 2 can be made negligible. The output signal from the reproducing head of a home video tape recorder is far weaker than the output signal from the reproducing head of a broadcasting video tape recorder. Accordingly, in order for the home video tape recorder to produce a high-quality reproduced image simultaneously with the recording of a video signal, it is required to make the leakage of a recording signal as small as possible. According to the input/output structure of amplifier shown in FIG. 7, it is relatively easy to reduce the crosstalk between recording and reproducing channels.

As has been explained in the foregoing, according to the present invention, there is provided a magnetic recording/reproducing apparatus which includes reproducing pre-amplifiers mounted on a rotating cylinder, and makes possible a special reproducing operation using two double azimuth heads and the monitoring of a reproduced image simultaneously with the recording of a video signal. In this magnetic recording/reproducing apparatus, each of recording and reproducing amplifiers is constructed to perform a differential operation, and the wiring between a reproducing head and a corresponding reproducing amplifier is made short to reduce the crosstalk between recording and reproduced channels, thereby obtaining a high-quality reconstructed image. Further, in the above apparatus, one of reproduced signals from two adjacent reproducing heads is selectively output, and a control signal for controlling the above selecting operation and other control signals are transferred between a rotating cylinder and a fixed side by multiplex transmission. Thus, the number of elements for transmitting signals between the rotating cylinder and the fixed side can be reduced. That is, according to the present invention, a magnetic recording/reproducing apparatus can be obtained which is low in manufacturing cost and excellent in picture quality of the reproduced image.

We claim:

1. A magnetic recording and reproducing apparatus for performing a reproducing operation simultaneously with a recording operation, comprising:
   a rotating cylinder;
   a pair of recording heads mounted on the rotating cylinder;
   first and second reproducing head groups, each formed of first and second double azimuth reproducing heads, mounted on the rotating cylinder and corresponding to first and second reproducing channels, respectively;
   first circuit means mounted on the rotating cylinder in close proximity to the first reproducing head group, including reproducing pre-amplifiers for amplifying output signals of the reproducing heads of the first reproducing head group, for alternately selecting the amplified output signals and mixing the alternately selected amplified output signals with azimuth discriminating information to produce a first reproduced signal;
   second circuit means mounted on the rotating cylinder in close proximity to the second reproducing head group, including reproducing pre-amplifiers for amplifying output signals of the reproducing heads of the second reproducing head group, for alternately selecting the amplified output signals and mixing the alternately selected amplified output signals with azimuth discriminating information to produce a second reproduced signal;

signal-transmission means for supplying a recording signal to the recording heads; and channel-signal selecting/outputting means for selectively outputting one of the first and second reproduced signals in accordance with an external channel selecting signal.

2. A magnetic recording and reproducing apparatus according to claim 1, wherein an input part of each reproducing pre-amplifier performs a differential operation.

3. A magnetic recording and reproducing apparatus according to claim 1, wherein the channel-signal selecting/outputting means includes first and second rotary transformers for respectively outputting the first and second reproduced signals from the rotating cylinder.

4. A magnetic recording and reproducing apparatus according to claim 3, wherein each of the first and second circuit means further includes:

means for comparing levels of the amplified output signals with each other;

switching means for outputting one of the amplified output signals which has a higher level in response to an output of the comparing means;

means for generating a head discriminating signal in response to the output of the comparing means; and means for mixing the head discriminating signal with the amplified output signal outputted from the switching means.

5. A magnetic recording and reproducing apparatus according to claim 3, wherein the external channel selecting signal is synchronized with field periods of a video signal, and wherein the channel-signal selecting/outputting means includes:

means for selecting one of the first and second reproduced signals in accordance with the external channel selecting signal;

means for generating a channel discriminating signal corresponding to the azimuth discriminating information mixed in the first and second reproduced signals in response to the first and second reproduced signals outputted by the first and second rotary transformers; and filter means for extracting a video signal from the first and second reproduced signals outputted by the first and second rotary transformers.

6. A magnetic recording and reproducing apparatus according to claim 1, wherein the recording and reproducing heads and the first and second circuit means are mounted on the rotating cylinder symmetrically with respect to an axis of rotation of the rotating cylinder.

7. A magnetic recording and reproducing apparatus for performing a reproducing operation simultaneously with a recording operation, comprising;

a rotating cylinder;

a pair of recording heads mounted on the rotating cylinder;

first and second reproducing head groups, each formed of first and second double azimuth reproducing heads, mounted on the rotating cylinder and corresponding to first and second reproducing channels, respectively;

first circuit means mounted on the rotating cylinder in close proximity to the first reproducing head group, including reproducing pre-amplifiers for amplifying output signals of the reproducing heads of the first reproducing head group, for alternately selecting the amplified output signals and mixing the alternately selected amplified output signals with azimuth discriminating information to produce a first reproduced signal, and for selectively outputting the first reproduced signal in accordance with a channel selecting signal;

second circuit means mounted on the rotating cylinder in close proximity to the second reproducing head group, including reproducing pre-amplifiers for amplifying output signals of the reproducing heads of the second reproducing head group, for alternately selecting the amplified output signals and mixing the alternately selected amplified output signals with azimuth discriminating information to produce a second reproduced signal, and for selectively outputting the second reproduced signal in accordance with the channel selecting signal;

first signal-transmission means for supplying a recording signal to the recording heads; and second signal-transmission means made up of a brush and a rotary ring for supplying the first and second circuit means with the channel selecting signal, the channel selecting signal being an external channel selecting signal, and for successively outputting the alternately selected first and second reproduced signals such that the successively outputted alternately selected first and second reproduced signals are superposed on the channel selecting signal.

8. A magnetic recording and reproducing apparatus according to claim 7, wherein an input part of each reproducing pre-amplifier performs a differential operation.

9. A magnetic recording and reproducing apparatus according to claim 7, wherein each of the first and second circuit means includes means for comparing the levels of reproduced signals from reproducing heads for forming a reproducing head group, switching means for outputting that one of the reproduced signals which has a higher level in response to the output of the comparing means, means for generating a head discriminating signal in response to the output of the comparing means, means for mixing the head discriminating signal with the output signal of the switching means, and means for controlling the application of the output signal of the mixing means to the second signal-transmission means in accordance with the channel selecting signal sent by the second signal-transmission means.

10. A magnetic recording and reproducing apparatus according to claim 7, wherein the first signal-transmission means is made up of a brush and a rotary ring, and wherein the apparatus further comprises an erasing head mounted on the rotating cylinder, an erasing-signal generator and a power source each provided on a fixed side, a mixer means provided on the fixed side for mixing an erasing signal from the erasing-signal generator with a source voltage from the power source, a third signal-transmission means made up of a brush and a rotary ring for transmitting the output signal of the mixer means to the rotating cylinder, and signal separating means provided on the rotating cylinder for extracting the erasing signal and the source voltage separately from the output signal of the mixer means.

11. A magnetic recording and reproducing apparatus according to claim 9, wherein the head-discriminating-signal generating means includes means for generating a difference in D.C. level between the reproduced signals from reproducing heads for forming the reproducing head group, and wherein the signal application control means includes two emitter-follower circuits which include PNP transistor and NPN transistor coupled with each other and each of the emitter-follower circuits is formed of a complementary circuit (PNP-NPN, or NPN-PNP) and are alternately turned on in accordance with high and low levels of the channel selecting signal.

12. In a magnetic recording and reproducing apparatus for performing a reproducing operation simultaneously with a recording operation, the apparatus including a recording head, at least one reproducing head, and at least one recording pre-amplifier for the at least one reproducing head, each mounted on a rotating cylinder, the improvement wherein an output part of a recording amplifier for supplying a recording current to the recording head is constructed to perform a differential operation, and an input part of the reproducing pre-amplifier is constructed to perform a differential operation.

13. A magnetic recording and reproducing apparatus according to claim 12, wherein a recording signal from a fixed side is transmitted to the rotating cylinder through first rotary transformer means, a signal which is produced by the reproducing head and then amplified by the reproducing pre-amplifier, is transmitted to the fixed side through second rotary transformer means, and the first and second rotary transformer means make use of a magnetic core in common.

14. A magnetic recording and reproducing apparatus of the rotating head type for reproducing a video signal from a magnetic tape by two double azimuth heads, the video signal being recorded on the magnetic tape by using two recording heads having different gap azimuth angles, alternately at intervals of one field, the apparatus comprising:
   pre-amplifiers mounted on a rotating cylinder for amplifying reproduced signals from reproducing heads making up first and second double azimuth heads;
   comparator means mounted on the rotating cylinder for comparing the levels of reproduced signals from two reproduced head making up one of the first and second double azimuth head;
   switching means mounted on the rotating cylinder for outputting that one of reproduced signals from two reproducing heads making up one of the first and second double azimuth heads which is higher in signal level, in response to the output of the comparator means;
   discriminating-signal generating means mounted on the rotating cylinder for generating an azimuth discriminating signal capable of indicating the gap azimuth of the reproducing head corresponding to the output signal of the switching means in response to the output of the comparator means;
   mixer means mounted on the rotating cylinder for mixing the azimuth discriminating signal with the output signal of the switching means;
   means for taking out the output signal of the mixer means from the rotating cylinder so that a continuous signal is formed;
   a reproduced-signal processing circuit for demodulating the continuous signal to output a video signal; and
   a discriminating circuit for judging the gap azimuth of the recording head corresponding to the reproduced signal, from the azimuth discriminating signal included in the continuous signal, and for sending a signal necessary for reproducing a chrominance signal correctly, to the reproduced-signal processing circuit.

15. A magnetic recording and reproducing apparatus for performing a recording operation simultaneously with a recording operation while substantially eliminating crosstalk between the recording operation and the reproducing operation, comprising:
   a rotating cylinder;
   a fixed cylinder;
   rotary transformer means provided between the fixed cylinder and the rotating cylinder;
   a recording head mounted on the rotating cylinder and having two input terminals for receiving respective recording signals;
   a reproducing head mounted on the rotating cylinder and having two output terminals for outputting respective reproduced signals;
   reproducing amplifier means for amplifying the reproduced signals from the reproducing head, the reproducing amplifier means being mounted on the rotary cylinder and having a differential input including two input terminals for receiving the reproduced signals from the two output terminals of the reproducing head, and having a differential output including two output terminals for outputting the amplified reproduced signals to the fixed cylinder through the rotary transformer means; and
   recording amplifier means for supplying the recording signals to the recording head, the recording amplifier means having a differential output including two output terminals for supplying the recording signals to the two input terminals of the recording head through the rotary transformer means;
   wherein the differential input and the differential output of the reproducing amplifier means and the differential output of the recording amplifier means substantially eliminate crosstalk between the recording operation and the reproducing operation.

* * * * *